(12) United States Patent
Choi et al.

(10) Patent No.: US 11,828,718 B2
(45) Date of Patent: Nov. 28, 2023

(54) HUMIDITY SENSOR AND BUTTON DEVICE INCLUDING THE SAME

(71) Applicant: ELECTRONICS AND TELECOMMUNICATIONS RESEARCH INSTITUTE, Daejeon (KR)

(72) Inventors: Choon Gi Choi, Daejeon (KR); Mondal Shuvra, Daejeon (KR); Bok Ki Min, Daejeon (KR); Yoonsik Yi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 47 days.

(21) Appl. No.: 17/314,038

(22) Filed: May 6, 2021

(65) Prior Publication Data

US 2021/0349045 A1   Nov. 11, 2021

(30) Foreign Application Priority Data

May 7, 2020   (KR) .................. 10-2020-0054525
Sep. 18, 2020  (KR) .................. 10-2020-0120876

(51) Int. Cl.
  *G01N 27/12*   (2006.01)
  *H01H 13/70*   (2006.01)
  (Continued)

(52) U.S. Cl.
  CPC ............. *G01N 27/121* (2013.01); *G01K 7/02* (2013.01); *G01K 7/16* (2013.01); *H01H 13/04* (2013.01); *H01H 13/70* (2013.01)

(58) Field of Classification Search
  CPC .......... G01K 7/02; G01K 7/16; G01N 27/121; G01N 27/223; H01H 13/04; H01H 13/70
  See application file for complete search history.

(56) References Cited

U.S. PATENT DOCUMENTS 8,047,074 B2   11/2011   Jun et al.
10,267,758 B2   4/2019   Gryska et al.
(Continued)

FOREIGN PATENT DOCUMENTS

JP   2019-040258 A   3/2019
KR   10-1209764 B1   12/2012
(Continued)

OTHER PUBLICATIONS

Shuvra Mondal et al., "Honeycomb-like MoS$_2$ Nanotube Array-Based Wearable Sensors for Noninvasive Detection of Human Skin Moisture", ACS Appl. Mater. Interfaces, Mar. 16, 2020, 12, 17029-17038.

*Primary Examiner* — Alvaro E Fortich
*Assistant Examiner* — Adam S Clarke
(74) *Attorney, Agent, or Firm* — Rabin & Berdo, P.C.

(57) ABSTRACT

Provided is a button device including a humidity sensor. The button device includes a substrate having a plurality of sensing regions, a housing on the substrate, the housing separating a first sensing region of the plurality of sensing regions from other sensing regions, a porous structure within the housing, the porous structure having through-holes, a first electrode on the porous structure, a second electrode on the porous structure, the second electrode being electrically connected to the first electrode through the porous structure, and a temperature sensor disposed adjacent to the first sensing region to sense a temperature of the first sensing region, The porous structure includes a body having an outer surface defining the through-holes, the body having an air gap therein.

4 Claims, 14 Drawing Sheets

(51) Int. Cl.
*H01H 13/04* (2006.01)
*G01K 7/02* (2021.01)
*G01K 7/16* (2006.01)

(56) References Cited

U.S. PATENT DOCUMENTS

| | | | |
|---|---|---|---|
| 2010/0155691 A1* | 6/2010 | Lee | H01L 21/02628 |
| | | | 977/762 |
| 2016/0209961 A1 | 7/2016 | Ahn | |
| 2017/0059419 A1 | 3/2017 | Park et al. | |
| 2018/0100841 A1 | 4/2018 | Ahn et al. | |
| 2019/0011288 A1* | 1/2019 | Nassar | A61B 5/01 |
| 2020/0158672 A1* | 5/2020 | Nakane | H01L 29/36 |
| 2020/0158673 A1* | 5/2020 | Nakane | H01L 23/60 |

FOREIGN PATENT DOCUMENTS

| | | |
|---|---|---|
| KR | 20150023785 A | 3/2015 |
| KR | 20150121368 A | 10/2015 |
| KR | 20170027566 A | 3/2017 |
| KR | 20180039350 A | 4/2018 |
| KR | 20180085577 A | 7/2018 |
| KR | 10-1990530 B1 | 9/2019 |
| KR | 20190135919 A | 12/2019 |
| WO | WO-2012-111904 A1 | 8/2012 |

\* cited by examiner

HUMIDITY SENSOR AND BUTTON DEVICE INCLUDING THE SAME

CROSS-REFERENCE TO RELATED APPLICATIONS

This U.S. non-provisional patent application claims priority under 35 U.S.C. § 119 of Korean Patent Application Nos. 10-2020-0054525, filed on May 7, 2020, and 10-2020-0120876, filed on Sep. 18, 2020, the entire contents of which are hereby incorporated by reference.

BACKGROUND

The present disclosure herein relates to a humidity sensor and a button device including the same, and more particularly, to a humidity sensor including a porous structure and a button device including the same.

Humidity sensors may be divided into electrical resistance type humidity sensors and capacitance type humidity sensors. In such an electrical resistance type humidity sensor, a material capable of absorbing water vapor in the air is disposed between a pair of electrodes to measure a resistance value of the material that varies according to the degree of absorption of the water vapor, thereby calculating relative humidity. In such a capacitance type humidity sensor, a dielectric constant of a material that varies according to the degree of absorption of water vapor is measured to calculate relative humidity. The electrical resistance type humidity sensor has a simple structure and enables mass production when compared to the capacitance type humidity sensor, but has a disadvantage in that sensitivity and reactivity at low relative humidity are deteriorated somewhat.

SUMMARY

The present disclosure provides a humidity sensor having improved measurement sensitivity.

The present disclosure also provides a button device having high accuracy and capable of operating in a non-contact manner.

The object of the present disclosure is not limited to the aforesaid, but other objects not described herein will be clearly understood by those skilled in the art from descriptions below.

An embodiment of the inventive concept provides a button device including: a substrate having a plurality of sensing regions; a housing on the substrate, the housing separating a first sensing region of the plurality of sensing regions from other sensing regions; a porous structure within the housing, the porous structure having through-holes; a first electrode on the porous structure; a second electrode on the porous structure, the second electrode being electrically connected to the first electrode through the porous structure; and a temperature sensor disposed adjacent to the first sensing region to sense a temperature of the first sensing region, wherein the porous structure includes a body having an outer surface defining the through-holes, the body having an air gap therein.

In an embodiment, the body may include at least one of graphene, transition metal chalcogenide, or MXene.

In an embodiment, the through-holes may pass through the porous structure in a direction perpendicular to a top surface of the substrate.

In an embodiment, each of the through-holes may have a maximum width of about 20 nm to about 300 nm.

In an embodiment, the button device may further include a bridge that passes through the air gap to connect inner sidewalls of the body to each other.

In an embodiment, the body may include a first inner sidewall and a second inner sidewall, which face each other, and the button device may further include a protrusion pattern protruding from the first inner sidewall to the second inner sidewall.

In an embodiment of the inventive concept, a humidity sensor includes: a substrate; a porous structure on the substrate the porous structure having through-holes; and a first electrode and a second electrode, which are provided on the porous structure and electrically connected to the porous structure, wherein the porous structure includes a body having an outer surface defining the through-holes, the body having an air gap therein, the body comprises transition metal chalcogenide, and each of the through-holes has a maximum width of about 20 or more nm to about 300 nm or less.

In an embodiment, the through-holes may pass through the porous structure in a direction perpendicular to a top surface of the substrate.

In an embodiment, the button device may further include a bridge that passes through the air gap to connect inner sidewalls of the body to each other.

In an embodiment, the body may include a first inner sidewall and a second inner sidewall, which face each other, and the button device may further include a protrusion pattern protruding from the first inner sidewall to the second inner sidewall.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
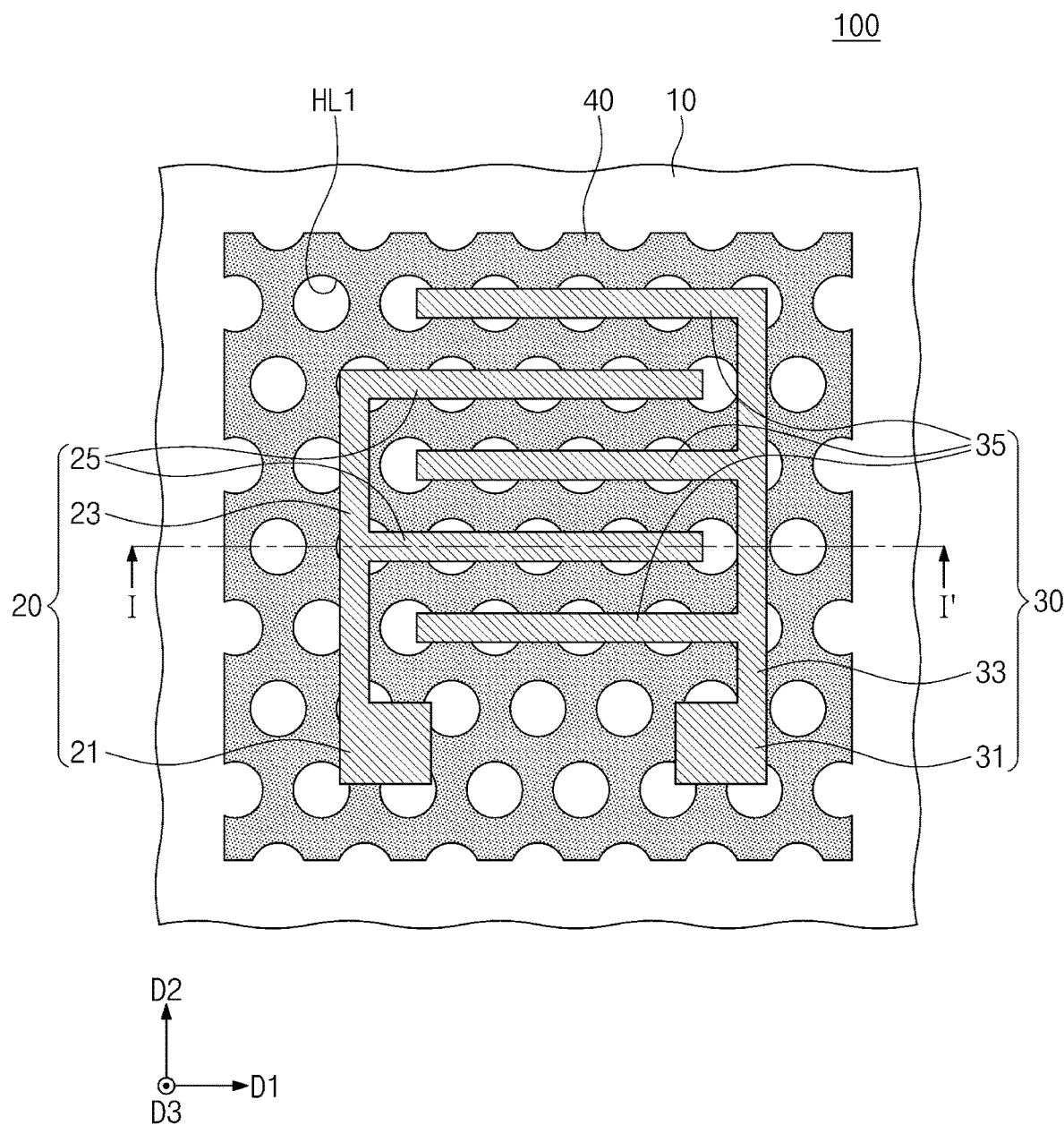
FIG. 1 is a plan view of a humidity sensor according to embodiments of the inventive concept.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description, the technical terms are used only for explaining a specific exemplary embodiment while not limiting the present invention. In this specification, the terms of a singular form may include plural forms unless specifically mentioned. The meaning of 'comprises' and/or 'comprising' specifies a component, a step, an operation and/or an element does not exclude other components, steps, operations and/or elements.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched region illustrated as a rectangle may be rounded or have a shape with a predetermine curvature. Regions exemplified in the drawings have general properties and are used to illustrate a specific shape of a device. Thus, this should not be construed as limited to the scope of the inventive concept.

Hereinafter, a humidity sensor according to an embodiment of the inventive concept will be described.

Figure 2:
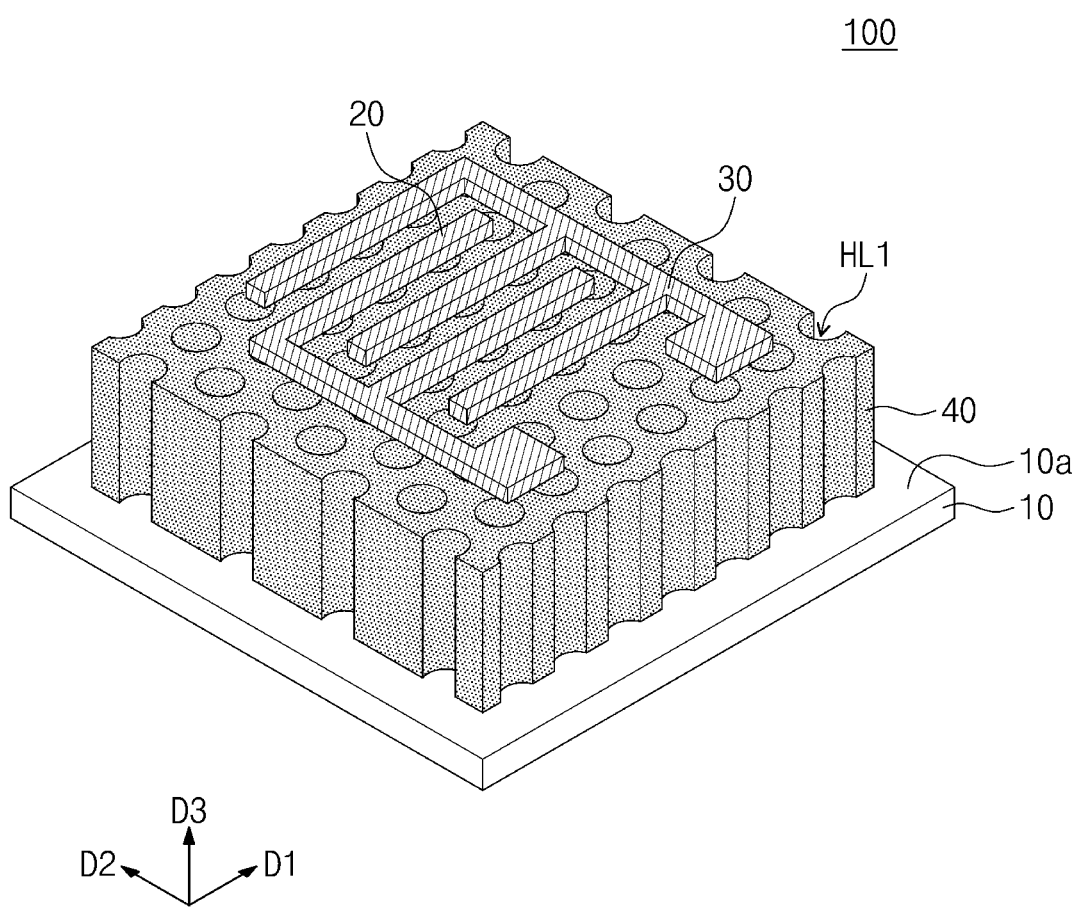
FIG. 2 is a perspective view of the humidity sensor according to embodiments of the inventive concept.
Figure 3:
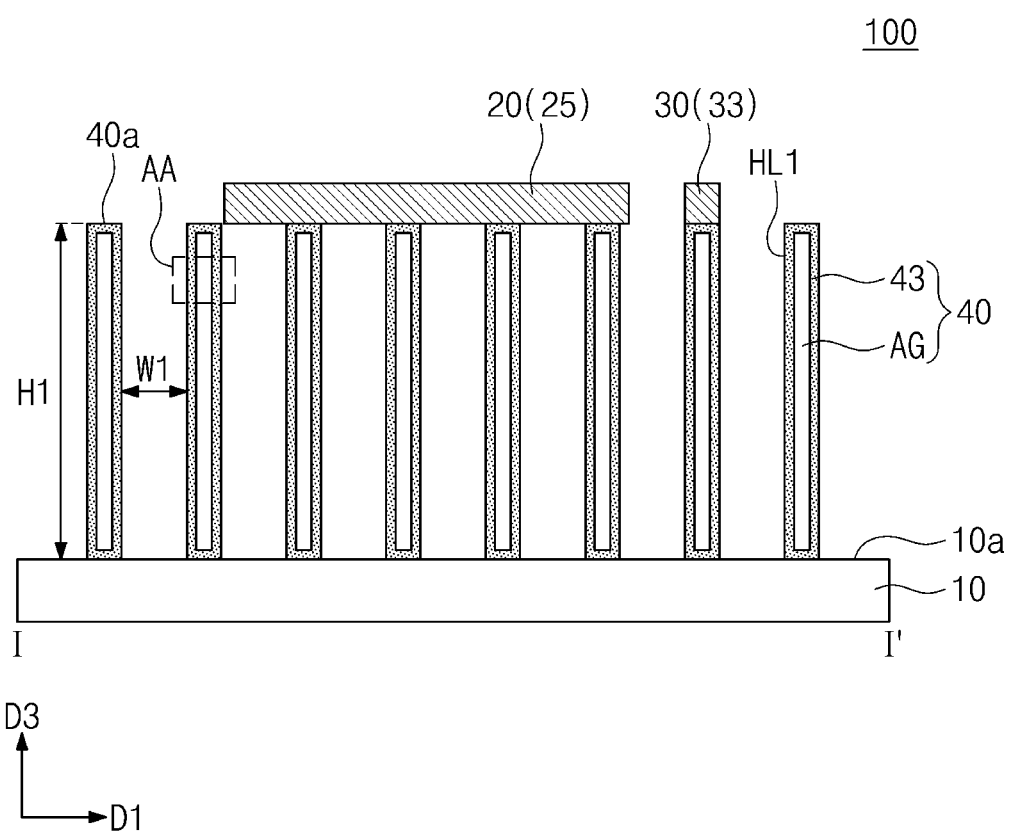
FIG. 3 is a cross-sectional view taken along line I-I' of FIG. 1.

FIG. 1 is a plan view of a humidity sensor according to embodiments of the inventive concept. FIG. 2 is a perspective view of the humidity sensor according to embodiments of the inventive concept. FIG. 3 is a cross-sectional view taken along line I-I' of FIG. 1.

Referring to FIGS. 1 to 3, a humidity sensor according to an embodiment of the present invention may include a substrate 10, a first electrode 20, a second electrode 30, and a porous structure 40.

The substrate 10 may be provided. The substrate 10 may have a flat top surface 10a. The substrate 10 may be a silicon substrate or a substrate including a polymer. For example, the polymer may be polyethylene terephthalate (PET), polycarbonate (PC), and/or polyethylene naphthalate (PEN). A first direction D1 may be a direction parallel to the top surface 10a of the substrate 10. A second direction D2 may be a direction that is parallel to the top surface 10a of the substrate 10, but is perpendicular to the first direction D1. A third direction D3 may be a direction perpendicular to the first direction D1 and the second direction D2.

A porous structure 40 may be provided on the top surface 10a of the substrate 10. The porous structure 40 may have a plurality of first through-holes HL1 passing through the porous structure 40. According to embodiments, each of the first through-holes HL1 may have a circular shape in a plan view. According to other embodiments, each of the first through-holes HL1 may have an oval shape, a square shape, a triangular shape, or a hexagonal shape in the plan view. The first through-holes HL1 may be arranged to be spaced apart from each other in the first direction D1 and the second direction D2. The first through-holes HL1 may pass through the porous structure 40 in the third direction D3. According to embodiments, each of the first through-holes HL1 has a predetermined thickness in the first direction D1 from the top surface 10a of the substrate 10 to a bottom surface of each of the first and second electrodes 20 and 30. The first through-holes HL1 may improve a specific surface area of the porous structure 40. Thus, the porous structure 40 may be improved in capacity in absorption of moisture in air.

A maximum width W1 of each of the first through-holes HL1 may range of about 20 nm to about 300 nm. When the maximum width W1 of the first through-holes HL1 is about 20 nm or less, the first through-holes HL1 may be excessively concentrated, and thus, the moisture in the air may not be properly adsorbed. On the other hand, when the maximum width W1 of the first through-holes HL1 is 300 nm or more, water molecules in the air may smoothly move into the first through-holes HL1, but the specific surface area may be relatively reduced to deteriorate sensing sensitivity.

The porous structure 40 may have a body 43 and an air gap AG within the body 43. The body 43 may have outer surfaces defining the first through-holes HL1. The body 43 may include a two-dimensional material. For example, the body 43 may include at least one of graphene, transition metal chalcogenide (TMDC), and MXene. For example, the transition metal chalcogenide may be, for example, molybdenum disulfide ($MoS_2$), molybdenum diselenide ($MoSe_2$), molybdenum disulfide ($MoTe_2$), tungsten disulfide ($WS_2$), and/or tungsten disulfide ($WSe_2$). MXene may refer to a transition metal carbide and include titanium carbide ($Ti_3C_2$) and the like. A height H1 of the body 43 (i.e., a height of the porous structure 40) may have a range of about 10 μm to about 50 μm.

The air gap AG may be surrounded by inner surfaces of the body 43.

That is, the air gap AG may be defined by inner surfaces of the body 43. As illustrated in FIG. 3, the air gap AG may have a shape that extends in the third direction D3 between the plurality of first through-holes HL1. Each of sidewalls of the body 43, which surrounds the air gap AG, may have a predetermined thickness. For example, two sidewalls of the body 43, which face each other in the first direction D1 with the air gap AG therebetween, may have the same thickness in the first direction D1. For example, an upper wall and a lower wall of the body 43, which face each other in the third direction D3 with the air gap AG therebetween, may have the same thickness in the third direction D3. The air gap AG may be an empty space after a porous membrane 41, which will be described later, is removed.

The first electrode 20 and the second electrode 30 may be provided on the porous structure 40. Each of the first electrode 20 and the second electrode 30 may electrically connected to the porous structure40. The first electrode 20 and the second electrode 30 may electrically connected to each other through the porous structure 40. Each of the first electrode 20 and the second electrode 30 may include, for example, a metal as a conductive material. The metal may include copper (Cu) and/or gold (Au). The first electrode 20 and the second electrode 30 may be one of an anode and a cathode. For example, when the first electrode 20 is the anode, the second electrode 30 may be the cathode, and when the first electrode 20 is the cathode, the second electrode 30 may be the anode. The first electrode 20 may include a first portion 21, a second portion 23, and a plurality of third portions 25 The first portion 21 of the first electrode 20 may be a portion connected to an external device. For example, the first portion 21 of the first electrode 20 may be a pad portion that connects the humidity sensor 100 to an external current measuring device. The second portion 23 of the first electrode 20 may be connected to the first portion 21 of the first electrode 20 to extend in the second direction D2. Each of the third portions 25 of the first electrode 20 may extend in the first direction D1 from the second portion 23 of the first electrode 20 and may be provided on a top surface of the porous membrane 41. Each of the third portions 25 of the first electrode 20 may extend toward the second electrode 30. The third portions 25 of the first electrode 20 may be disposed to be spaced apart from each other in the second direction D2.

The second electrode 30 may include a first portion 31, a second portion 33, and third portions 35. The first part 31 of the second electrode 30 may be a portion that connects the external device to the second electrode 30. For example, the first portion 31 of the second electrode 30 may be a pad portion connected to the external current measuring device. The second portion 33 of the second electrode 30 may be connected to the first portion 31 of the second electrode 30 to extend in the second direction D2. Each of the third portions 35 of the second electrode 30 may extend in the first direction D1 from the second portion 33 of the second electrode 30 and may be provided on the top surface of the porous membrane 41. Each of the third portions 35 of the second electrode 30 may extend toward the first electrode 20. The third portions 35 of the second electrode 30 may be disposed to be spaced apart from each other in the second direction D2. Each of the third portions 35 of the second electrode 30 may be disposed between the third portions 25 of the first electrode 20. Thus, the third portions 35 of the second electrode 30 and the third portions 25 of the first electrode 20 may be alternately disposed in the second direction D2.

Current input from the external device to the first electrode 20 may pass through the porous structure 40 and then be output to the external device again through the second electrode 30. The body 43 of the porous structure 40 may adsorb the water molecules in the air. Thus, a resistance value of the porous structure 40 may vary. When the resistance value of the porous structure 40 varies, a current value between the first electrode 20 and the second electrode 30 may vary. Thus, humidity may be measured by measuring the current value through the external current measuring device. In the humidity sensor according to an embodiment of the inventive concept, the porous structure may include the plurality of through-holes H to increase in specific surface area of the porous structure 40. Thus, the body 43 of the porous structure 40 may more effectively adsorb the water molecules in the air over a large area to improve the sensing sensitivity.

Figure 4A:
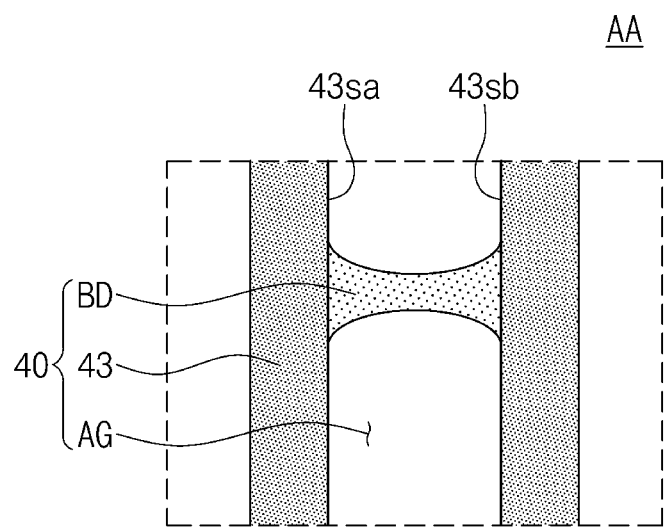
FIGS. 4A and 4B are enlarged cross-sectional views for explaining the humidity sensor, which corresponds to a portion AA of FIG. 3, according to embodiments of the inventive concept.
Figure 4B:
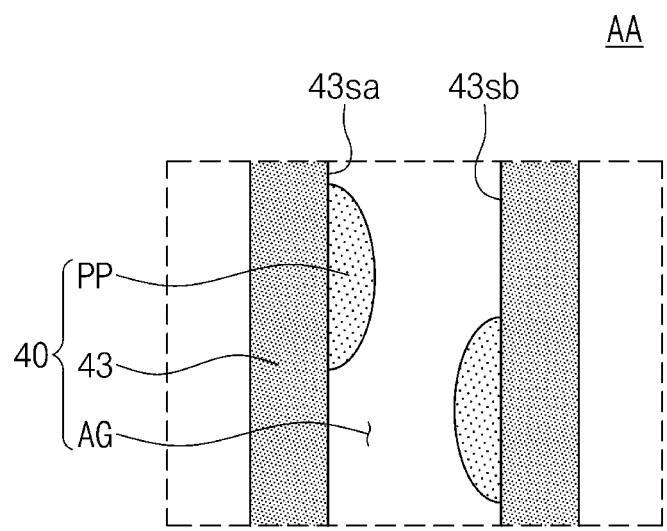

FIGS. 4A and 4B are enlarged cross-sectional views for explaining the humidity sensor, which corresponds to a portion AA of FIG. 3, according to embodiments of the inventive concept.

Referring to FIGS. 3 and 4A, the porous structure 40 may include a bridge BD. The bridge BD may extend in the first direction D1 to support the body 43.

Particularly, the body 43 may include a first inner surface 43sa and a second inner surface 43sb, which face each other with the air gap AG therebetween. The bridge BD may pass through the air gap AG to connect the first inner surface 43sa to the second inner surface 43sb. According to embodiments, the bridge BD may have a thickness that is gradually narrowed as moving away from the first inner surface 43sa and the second inner surface 43sb. The bridge BD may include metal oxide. The bridge BD may include, for example, aluminum oxide.

According to embodiments, the body 43 may have two sidewalls facing each other in the first direction D1 with the air gap AG therebetween. A thickness of each of the two sidewalls in the first direction D1 may be less than that of the air gap AG in the first direction D1.

Referring to FIGS. 3 and 4B, the porous structure 40 may include protrusions PP. Each of the protrusions PP may protrude from the first inner surface 43sa toward the second inner surface 43sb or may protrude from the second inner surface 43sb toward the first inner surface 43sa. The protrusion PP may have, for example, a hemispherical shape. The protrusions PP may include metal oxide. The protrusions PP may include, for example, aluminum oxide.

Figure 5A:
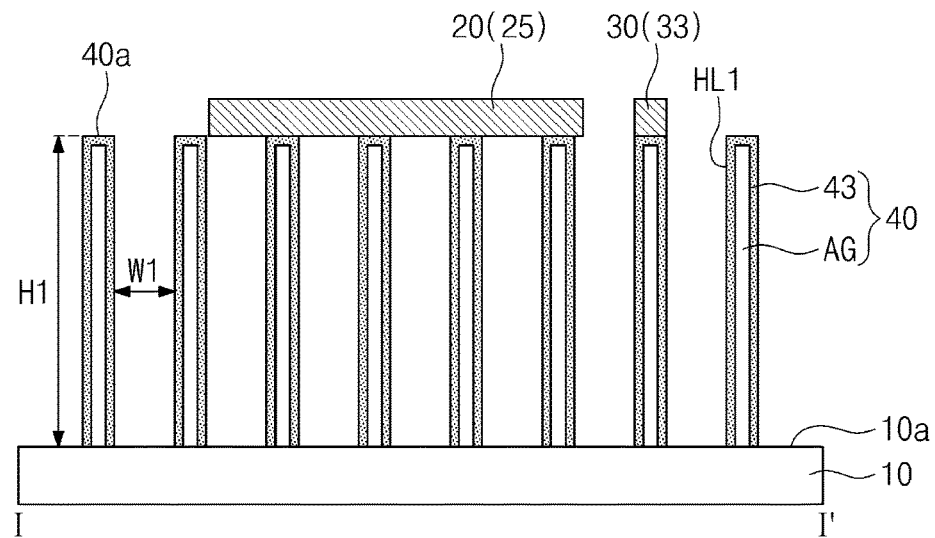
FIGS. 5A and 5B are cross-sectional views for explaining the humidity sensor, taken along line I-I' of FIG. 1, according to embodiments of the inventive concept.
Figure 5B:
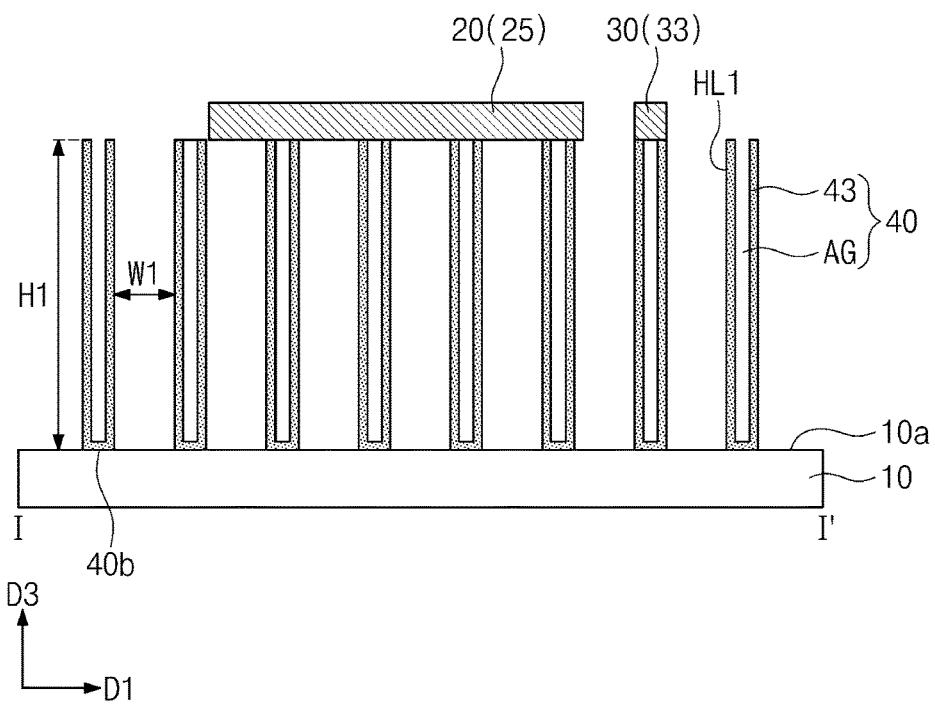

FIGS. 5A and 5B are cross-sectional views for explaining the humidity sensor, taken along line I-I' of FIG. 1, according to embodiments of the inventive concept.

Referring to FIG. 5A, the body 43 may have a pipe shape of which an upper end 40a is closed, and a lower end is opened. Thus, a lower end of the air gap AG may be defined by the top surface of the substrate 10.

Referring to FIG. 5B, the body 43 may have a pipe shape of which an upper end is opened, and a lower end 40b is closed. Thus, a portion of the upper end of the air gap AG may be covered by the first electrode 20 and the second electrode 30.

[Manufacturing Method]

Figure 6A:
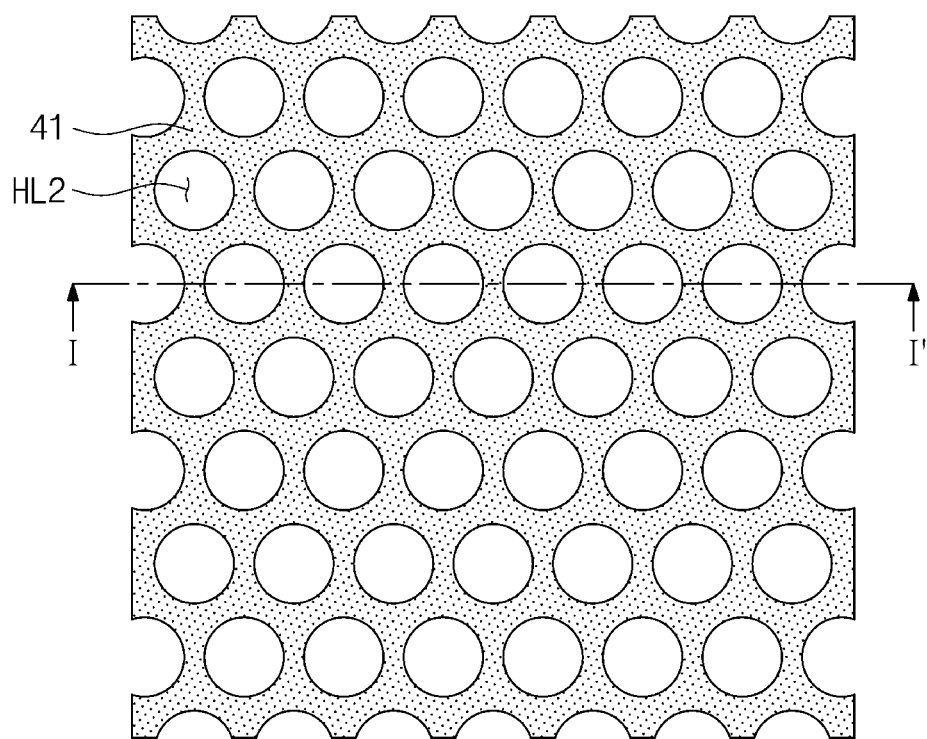
FIGS. 6A and 8A are plan views for explaining a method for manufacturing a humidity sensor according to embodiments of the inventive concept.
Figure 6B:
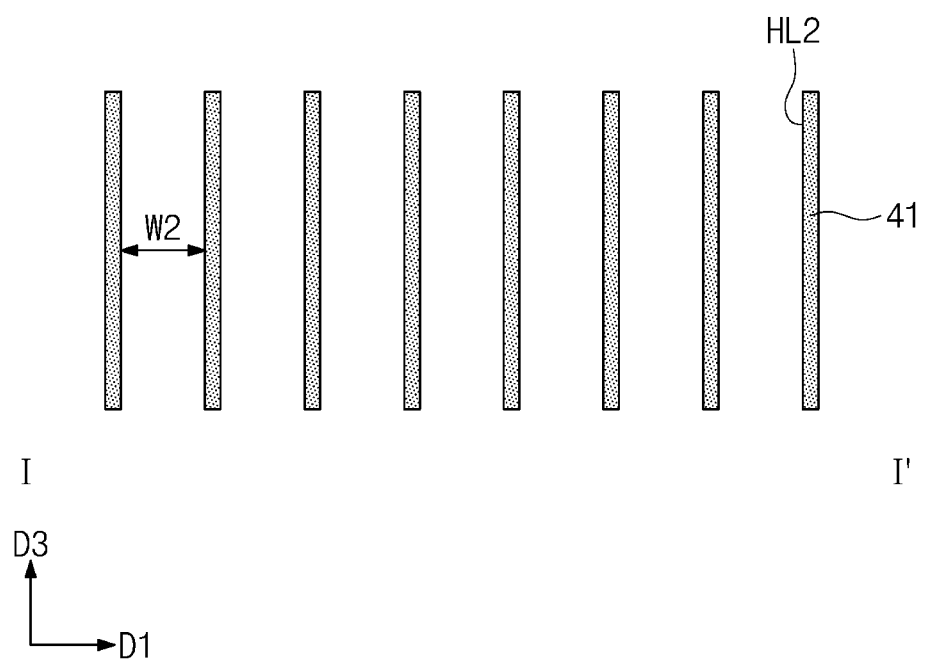
FIGS. 6B and 8B are cross-sectional views for explaining the method for manufacturing the humidity sensor, taken along line I-I' of FIGS. 6A and 8A, according to embodiments of the inventive concept.
Figure 7:
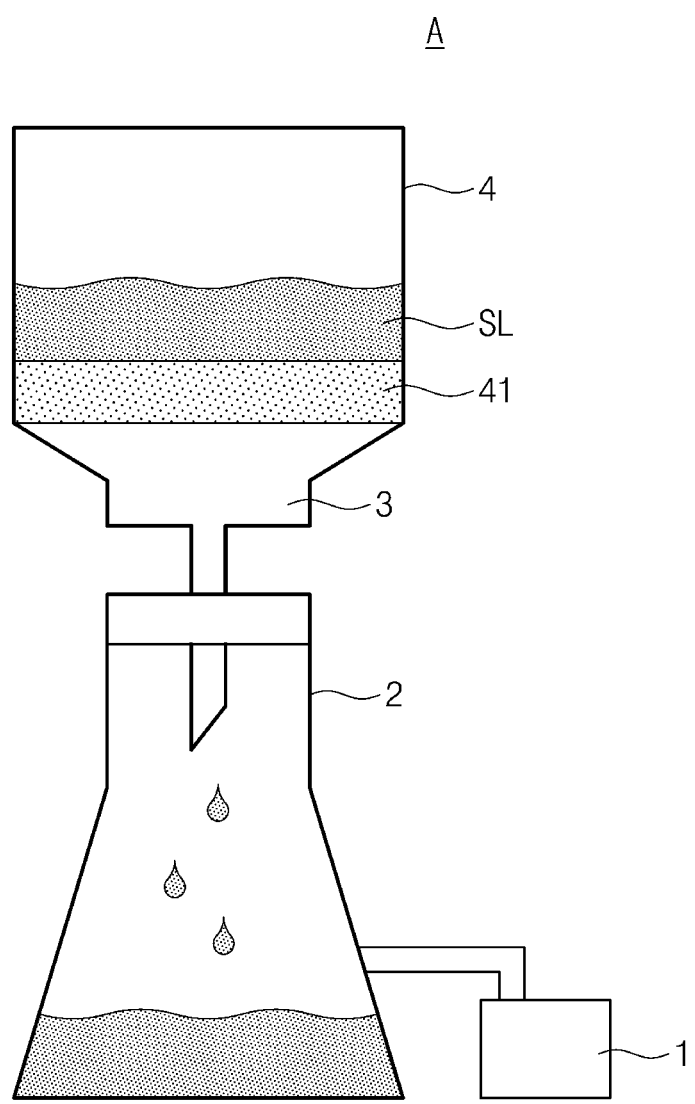
FIGS. 7 and 9 to 11 are views for explaining the method for manufacturing the humidity sensor according to embodiments of the inventive concept.
Figure 8A:
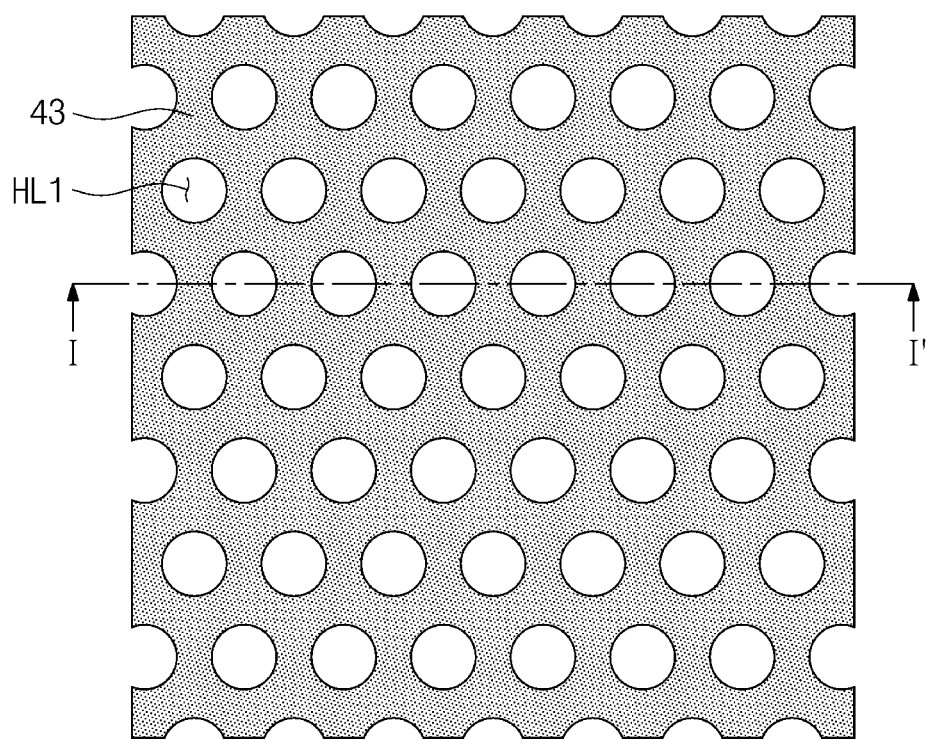
Figure 8B:
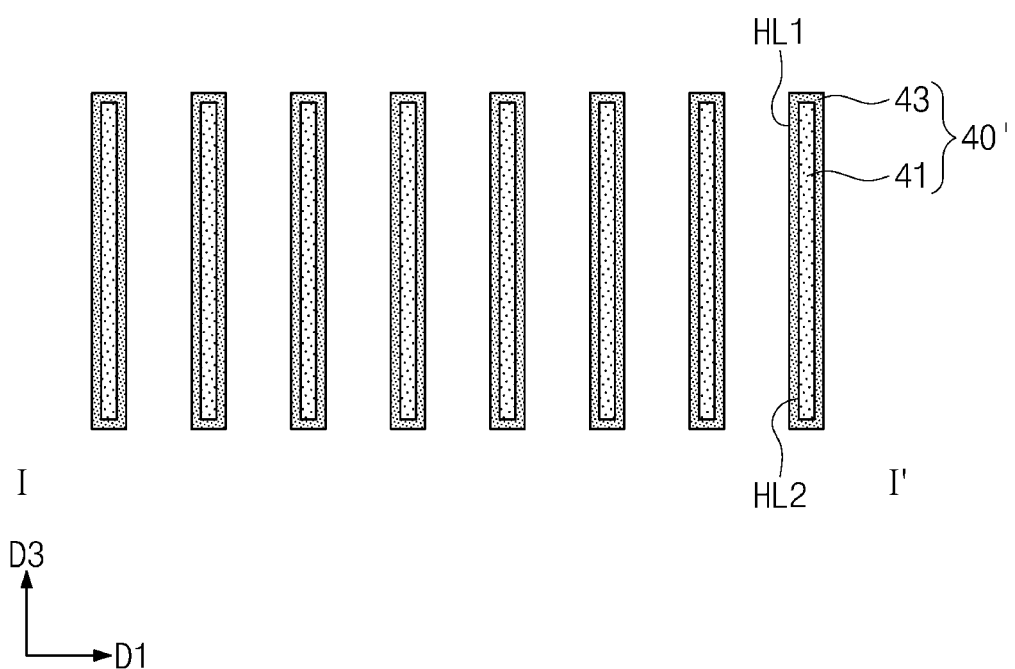

FIGS. 6A and 8A are plan views for explaining a method for manufacturing a humidity sensor according to embodiments of the inventive concept. FIGS. 6B and 8B are cross-sectional views for explaining the method for manufacturing the humidity sensor, taken along line I-I' of FIGS. 6A and 8A, according to embodiments of the inventive concept. FIGS. 7 and 9 to 11 are views for explaining the method for manufacturing the humidity sensor according to embodiments of the inventive concept.

Referring to FIGS. 6A and 6B, a porous membrane 41 may be prepared. The porous membrane 41 may include metal oxide, for example, aluminum oxide. More particularly, the porous membrane may be anodic aluminum oxide (AAO). The porous membrane 41 may have a plurality of second through-holes HL2. Each of the second through-holes HL2 may have a circular shape in a plan view. A maximum width W2 of each of the second through-holes HL2 may be about 50 nm or more and about 350 nm or less.

Referring to FIG. 7 together with FIGS. 6A and 6B, a vacuum filtering device A may be prepared. The vacuum filtering device A may include a vacuum pump 1, a first container 2, a connection part 3, a first solution SL, and a second container 4. The vacuum pump 1 may be connected to the first container 2 so that the inside of the first container 2 is formed to a vacuum condition. The first solution SL may be provided in the second container 4. The first solution SL may be prepared by dissolving transition metal chalcogenide in a solvent. For example, the first solution SL1 may be prepared by dissolving ammonium tetrathio molybdate $((NH_4)_2MoS_4)$ in the solvent in an amount of about 0.5 wt % or more and about 5 wt % or less. The solvent may include, for example, ethylene glycol. The first container 2 and the second container 4 may be connected to each other through the connection part 3. More particularly, the porous membrane 41 may be disposed between the connection part 3 and the second container 4. The first solution SL in the second container 4 may pass through the porous membrane 41 and then be fall into the first container 2. The higher the vacuum condition is formed using the vacuum pump 1, the better the first solution SL passes through the porous membrane 41. The first solution SL may be conformally applied to a surface of the porous membrane 41 while passing through the porous membrane 41. Particularly, the first solution SL may be applied to top and bottom surfaces of the porous membrane 41 and inner surfaces of the second through-holes HL2.

Referring to FIGS. 8A and 8B, a heat treatment process may be performed on the porous membrane 41. The heat treatment process may be performed for a time period of about 30 minutes or more and about 1 hour or less under a temperature condition of about 600° C. or more and about 1,000° C. or less. The heat treatment process may be performed to form a body 43 including molybdenum disulfide ($MoS_2$) on the porous membrane 41. The body 43 may cover inner walls of the second through-holes HL2 and the top and bottom surfaces of the porous membrane 41. The body 43 may cover the inner walls of the second through-holes HL2 of the porous membrane 41. Thus, a preliminary porous structure 40' may be formed. The preliminary porous structure 40' may have a plurality of first through-holes HL1. The first through-holes HL1 may be substantially the same as those described in FIGS. 1 to 3.

Figure 9:
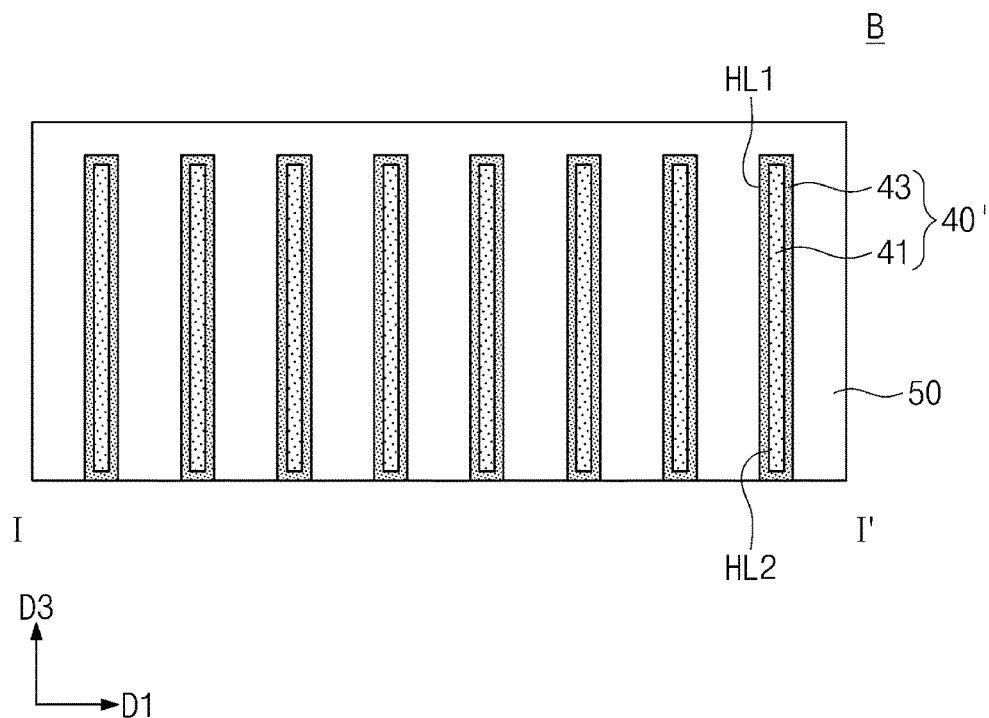
Figure 10:
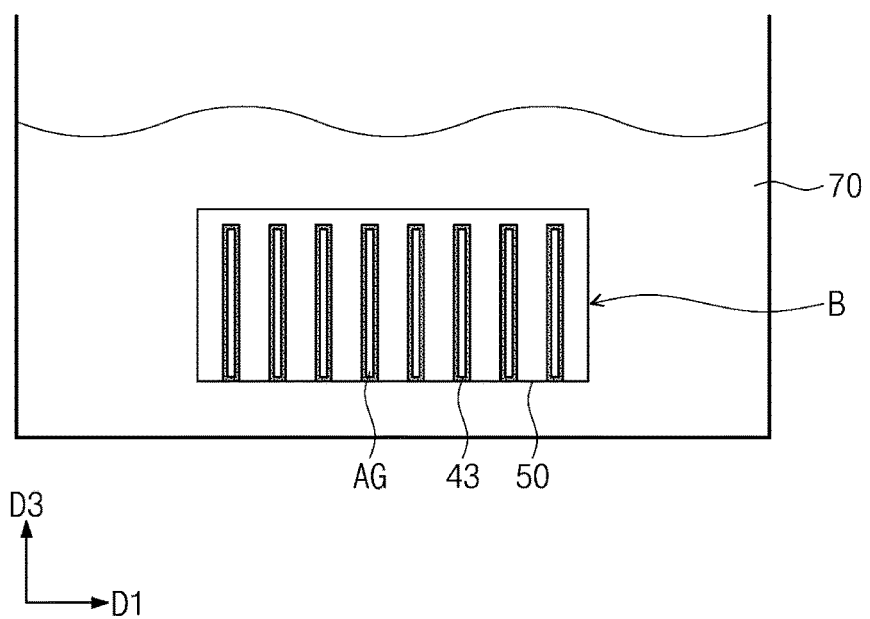
Figure 11:
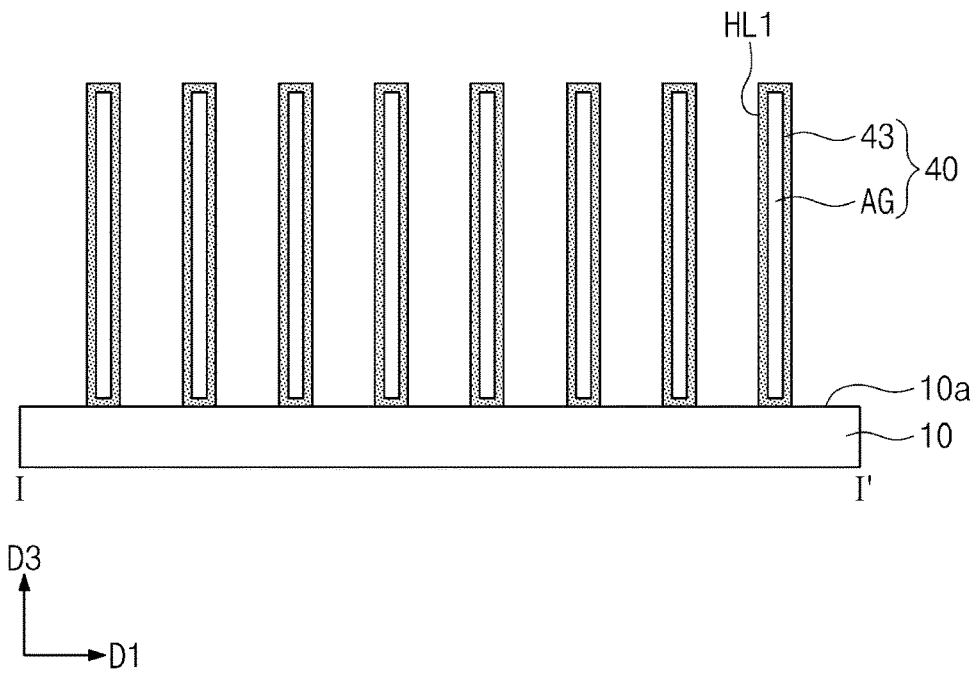

Referring to FIG. 9, a second body 50 may be formed on the preliminary porous structure 40'. The second body 50 may be formed by performing a spin coating process after providing a PMMA solution on the preliminary porous structure 40'. The spin coating process may be performed for a time period of about 10 seconds or more and about 30 seconds or less under a rotation condition of about 2,000 rpm. A poly(metyl methacrylate) (PMMA) solution provided on the preliminary porous structure 40' may conformally cover a surface of the preliminary porous structure 40' through the spin coating process. The second body 50 may expose a portion of the preliminary porous structure 40'. For example, the portion of the preliminary porous structure 40', which is exposed by the second body 50, may be a lower portion of the preliminary porous structure 40'. Thus, a sodium hydroxide aqueous solution (NaOH) may be permeated into the preliminary porous structure 40' in an etching process to be performed later. The second body 50 may support the preliminary porous structure 40' while performing the etching process to prevent the porous structure from being damaged. Thus, a preliminary porous structure B, in which the second body 50 is formed, may be formed.

Referring to FIG. 8, the etching process may be performed on the preliminary porous structure B provided with the second body 50. The etching process may be performed using an aqueous sodium hydroxide solution (NaOH). A concentration of the aqueous sodium hydroxide solution (NaOH) may be about 0.5 M or more and about 3 M or less. The porous membrane 41 of the preliminary porous structure 40' may be removed through the etching process. An air gap AG may be formed in a space from which the porous membrane 41 is removed. Thus, the porous structure 40 including the air gap AG and the body 43 may be formed.

Since the porous membrane 41 is removed, flexibility of the porous structure 40 may be improved. The etching process may include a post process of rinsing the porous structure 40 several times by using distilled water. In the etching process, the second body 50 may not be removed.

Referring to FIG. 9 together with FIG. 3, a transfer process is performed to transfer the porous structure 40 onto the top surface 10a of the substrate 10. The second body 50 surrounding the porous structure 40 may be removed after performing the transfer process. As illustrated in FIG. 3, a deposition process is performed on the top surface 10a of the porous structure 40 to form the first electrode 20 and the second electrode 30. According to the manufacturing method, the humidity sensor according to the foregoing embodiments described in FIGS. 1 to 3 may be manufactured.

[Experimental Example 1]

A porous membrane containing anodic aluminum oxide (AAO) is prepared. A transition metal chalcogenide solution is permeated into the porous membrane by using vacuum filtration device (Whatman Laboratory Products). The transition metal chalcogenide solution is prepared by dissolving ammonium tetrathio molybdate (($NH_4$)$_2MoS_4$) at a concentration of about 1.25 wt % using ethylene glycol as a solvent. The porous membrane is thermally treated using a thermochemical vapor deposition (TCVD) method. Here, the heat treatment temperature is about 600° C. or more and about 1,000° C. or less, and a heat treatment time is about 30 minutes or more and about 1 hour or less. Thus, a porous structure including $MoS_2$ may be formed. A PMMA solution is applied to the porous structure using a spin coater. Here, a spin speed is about 2000 rpm, and spin coating is performed for about 30 seconds. The porous membrane inside the porous structure is removed using an aqueous NaOH solution. After transferring the porous structure onto the prepared substrate, the applied PMMA is removed. A humidity sensor is manufactured by depositing a first electrode and a second electrode on the porous structure. To measure a reaction rate according to a change in humidity of the humidity sensor, each of a first reaction time when the relative humidity increases from about 45% to about 85% and a second reaction time when the relative humidity decreases from about 85% to about 45% is measured.

Table 1 below shows the first reaction time and the second reaction time, which are measured in Experimental Example 1.

TABLE 1

| | First reaction time | Second reaction time |
|---|---|---|
| Experimental example 1 | 0.47 seconds | 0.81 seconds |

Referring to Table 1, in the case of Experimental Example 1, it is seen that both the first reaction time and the second reaction time are within about 1 second. It is seen that a response time of the humidity sensor is quicker than that of each of the existing humidity sensors, which are commercially available and have a reaction time of a few seconds to several tens of seconds.

[Comparison Example 1]

A humidity sensor was manufactured under the same conditions as in Experimental Example 1. However, a film-type membrane that does not include a porous structure, instead of the porous membrane, is used.

Figure 12:
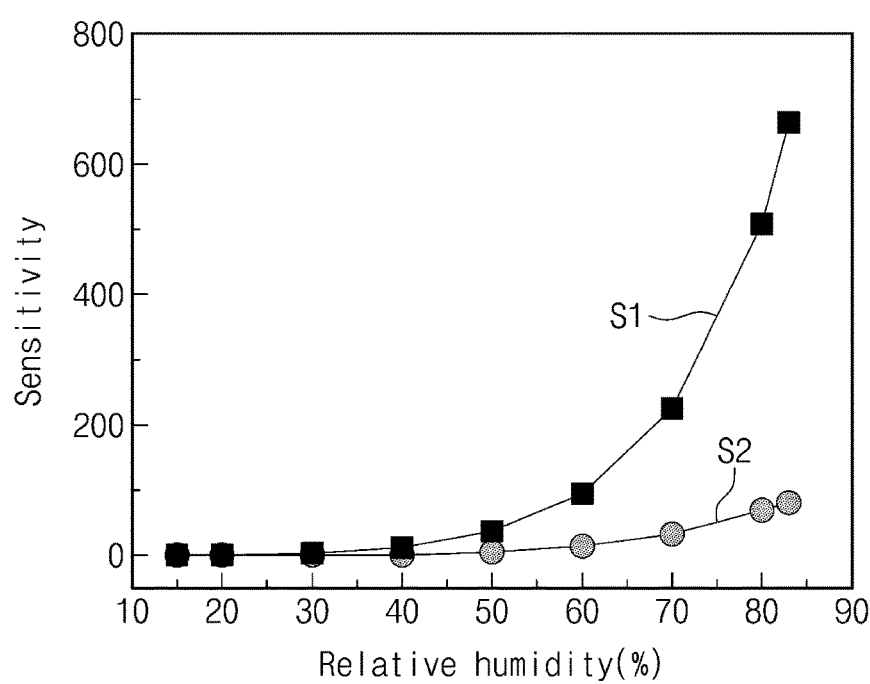
FIG. 12 is a graph illustrating sensing sensitivity of the humidity sensor according to embodiments of the inventive concept.

FIG. 12 is a graph illustrating sensing sensitivity of the humidity sensor according to embodiments of the inventive concept. Equation 1 is an equation that shows the definition of the sensor sensitivity of FIG. 12.

$$\text{Sensor Sensitivity} = (I_H/I_0) - 1 \qquad \text{[Equation 1]}$$

The $I_H$ refers to a current value measured at the current humidity, and the $I_0$ refers to a current value measured at humidity of dry air ($N_2$) in a chamber.

Referring to FIG. 12 together with Equation 1, in the case of Experimental Example 1 (S1), it is seen that, as the relative humidity increases, an inclination of the sensor sensitivity increases steeply. On the other hand, in the case of Comparative Example 1 (S2), it is seen that, as the relative humidity increases, the inclination of the sensor sensitivity is not changed significantly. As a result, it is seen that the performance of the humidity sensor is improved by using the porous structure having a high specific surface area in Experimental Example 1.

Hereinafter, a button device including a humidity sensor according to an embodiment of the inventive concept will be described.

Figure 13:
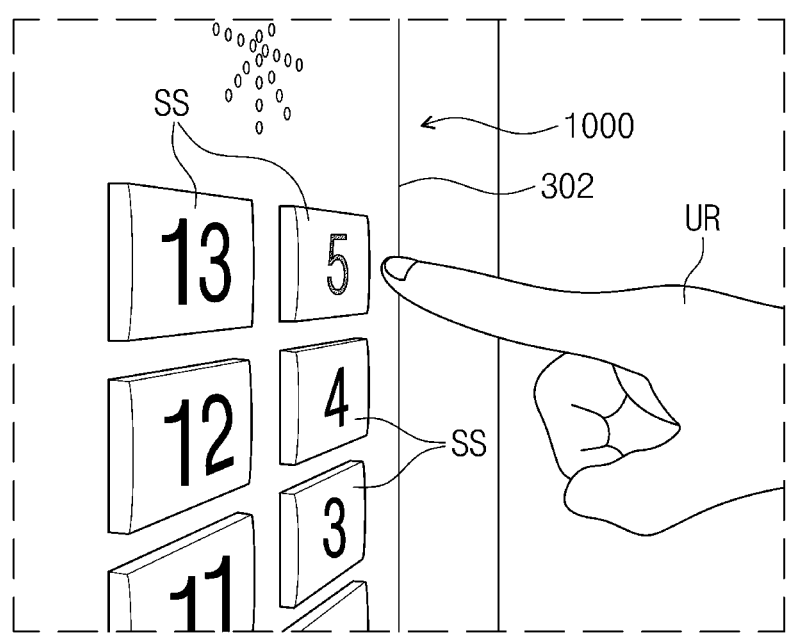
FIG. 13 is a perspective view of a button device according to embodiments of the inventive concept.
Figure 14:
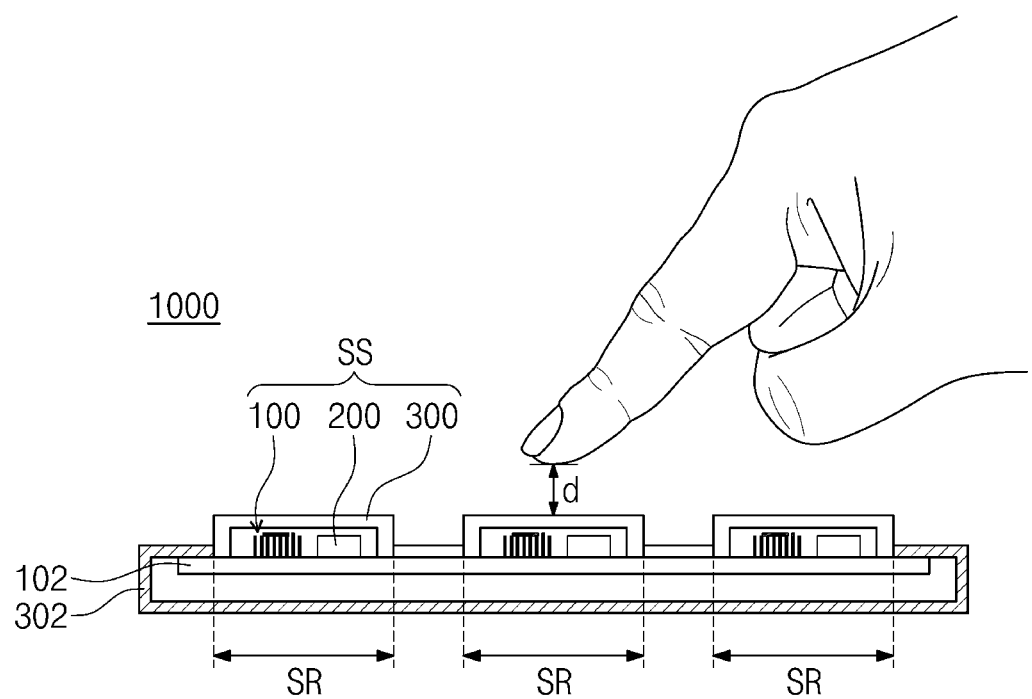
FIG. 14 is a cross-sectional view of the button device according to embodiments of the inventive concept.

FIG. 13 is a perspective view of a button device according to embodiments of the inventive concept. FIG. 14 is a cross-sectional view of the button device according to embodiments of the inventive concept.

Referring to FIG. 13, a button device 1000 according to embodiments of the inventive concept may include a back plate 302 and a plurality of sensor structures SS arranged two-dimensionally on the back plate 302. Each of the plurality of sensor structures SS may protrude from the back plate 302 to receive an input signal from a user. According to embodiments, the button device 1000 may be an interface device of an elevator.

The button device 1000 may sense humidity generated by a user's gesture. For example, a user UR may indicate one of the plurality of sensor structures SS by using his/her hand, and the indicated sensor structure SS may sense humidity generated in the atmosphere from the hand of the user UR so as to be turned on or off. For example, when the button device 1000 is the interface device of the elevator, the button device 1000 may output various signals in response to a user's gesture input. For example, various operation signals may include a signal for lighting light emitting elements, a signal for generating an acoustic signal from a speaker of the button device 1000, and/or a driving signal for an operation of an elevator in the sensor structures SS.

Particularly, referring to FIG. 14, the button device 1000 may include a substrate 102 having a plurality of sensing regions SR. The substrate 102 may include a controller and lines connecting the controller to the plurality of sensor structures SS. The substrate 102 may include, for example, a printed circuit board and a semiconductor chip mounted on the printed circuit board. The plurality of sensing regions SR may be disposed to be spaced apart from each other in a direction parallel to a top surface of the substrate 102. The plurality of sensing regions SR may have the same size.

The sensor structures SS may be disposed in the sensing regions SR of the substrate 102. Each of the sensor structures SS may include a humidity sensor 100, a temperature sensor 200, and a housing 300. The housing 300 may be disposed on the substrate 102 to define an inner space in which the humidity sensor 100 and the temperature sensor 200 are provided. The housing 300 may define the sensing regions SR. The housing 300 may separate one sensing region SR of the plurality of sensing regions SR from other sensing regions SR.

The humidity sensor 100 may be disposed on the substrate 102. The humidity sensor 100 may be disposed in the inner space of the housing 300 in the sensing regions SR. The humidity sensor 100 may be the same as/similar to the humidity sensor 100 described with reference to FIGS. 1 to 12. For example, the humidity sensor 100 may include a porous structure 40 and a first electrode 20 and a second electrode 30, which are electrically connected to the porous structure 40, as illustrated in FIG. 3. The humidity sensor 100 may sense humidity generated by the gesture of the user UR.

A temperature sensor 200 may be disposed on the substrate 102. The temperature sensor 200 may be disposed in the inner space of the housing 300 in the sensing regions SR. According to embodiments, the temperature sensor 200 may be disposed at one side of the humidity sensor 100. The temperature sensor 200 may include, for example, a thermocouple or a resistance temperature detector.

The controller may receive a signal including humidity information from the humidity sensor 100 to determine whether a distance d between the hand of the user UR and the sensor structure SS is within a threshold distance. For example, the critical distance between the sensor structures SS may range of about 3 mm to about 15 mm. The controller may include a measurement unit, a signal processing unit, and an operation unit.

The measurement unit may receive a signal including humidity information and temperature information from the humidity sensor 100 and the temperature sensor 200 to provide the received signal to the signal processing unit.

The signal processing unit may include a calibration circuit for calibrating the humidity information before the gesture of the user UR occurs, among the temperature information provided from the humidity sensor 100. The signal processing unit may include a temperature compensation circuit that receives a signal including temperature information to correct the humidity information according to a temperature of each of the sensing regions SR. The signal processing unit may determine which a sensor structure SS of the plurality of sensor structures SS is indicated by the gesture of the user UR by using humidity change information generated by the humidity information and the temperature information. The signal processing unit may provide a sensing signal including information on the sensor structure SS indicated by the user UR to the operation unit.

The operation unit may generate an operation signal by receiving the sensing signal from the signal processing unit. The operation signal may include a signal for lighting light emitting elements, a signal for generating an acoustic signal from a speaker of the button device 1000, and/or a signal for an operation of an elevator in the sensor structures SS.

As described with reference to FIG. 12, the humidity sensor 100 according to embodiments of the inventive concept may sense a change in humidity due to the gesture of the user UR within a response time of less than about 1 second.

Therefore, it may be applied to a device requiring an immediate response to the user interface such as the elevator. As the humidity sensor 100 according to embodiments of the inventive concept has high sensitivity, the humidity may be sensed even when separate holes are not formed in the housing 300. Therefore, since foreign substances are prevented from being introduced into the inner space of the housing 300, stability and reliability of the button device 1000 may be improved.

The humidity sensor according to the embodiment of the inventive concept may include the porous structure. The porous structure may include the plurality of holes to realize the high specific surface area. The porous structure may include the two-dimensional material such as graphene, transition metal chalcogenide, and MXene. Therefore, the measurement sensitivity of the humidity sensor may be improved.

The button device according to the embodiment of the inventive concept may include the humidity sensor to provide the user interface.

In the above, the embodiments of the inventive concept have been described with reference to the accompanying drawings, but the present disclosure may be implemented in other specific forms without changing the technical spirit or essential features. Therefore, it should be understood that the above-disclosed embodiments are to be considered illustrative and not restrictive.

What is claimed is:

1. A button device comprising:
a substrate having a plurality of sensing regions;
a housing on the substrate, the housing separating a first sensing region of the plurality of sensing regions from other sensing regions;
a porous structure within the housing, the porous structure having through-holes;
a first electrode on the porous structure;
a second electrode on the porous structure, the second electrode being electrically connected to the first electrode through the porous structure; and
a temperature sensor disposed adjacent to the first sensing region to sense a temperature of the first sensing region,
wherein the porous structure comprises:
a body having through-holes that expose a portion of an upper surface of the substrate and have a first diameter;
a bridge provided on inner sidewalls of the body in at least one of the through-holes, the bridge blocking the upper surface of the substrate; and
protrusion patterns provided on the inner sidewalls of the body in at least one of the through-holes, the protrusion patterns exposing the upper surface of the substrate to a second diameter smaller than the first diameter.

2. The button device of claim 1, wherein the body comprises at least one of graphene, transition metal chalcogenide, or MXene.

3. The button device of claim 1, wherein each of the through-holes has a maximum width of about 20 nm to about 300 nm.

4. A humidity sensor comprising:
a substrate;
a porous structure on the substrate the porous structure having through-holes; and
a first electrode and a second electrode, which are provided on the porous structure and electrically connected to the porous structure,
wherein the porous structure comprises:
a body having through-holes that expose a portion of an upper surface of the substrate and have a first diameter;
a bridge provided on inner sidewalls of the body in at least one of the through-holes, the bridge blocking the upper surface of the substrate; and
protrusion patterns provided on the inner sidewalls of the body in at least one of the through-holes, the protrusion patterns exposing the upper surface of the substrate to a second diameter smaller than the first diameter.

* * * * *